United States Patent
Ishizaki et al.

(10) Patent No.: US 12,098,938 B2
(45) Date of Patent: Sep. 24, 2024

(54) ULTRASONIC TRANSCEIVER INCLUDING PIEZOELECTRIC ELEMENT AND STACKED LAYERS OF A PLURALITY OF MATCHING LAYERS, AND ULTRASONIC FLOW METER HAVING THE ULTRASONIC TRANSCEIVER

(71) Applicant: Panasonic Intellectual Property Management Co., Ltd., Osaka (JP)

(72) Inventors: Yudai Ishizaki, Kyoto (JP); Tomoki Masuda, Osaka (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 17/614,663

(22) PCT Filed: Jul. 28, 2020

(86) PCT No.: PCT/JP2020/028821
§ 371 (c)(1),
(2) Date: Nov. 29, 2021

(87) PCT Pub. No.: WO2021/024846
PCT Pub. Date: Feb. 11, 2021

(65) Prior Publication Data
US 2022/0228894 A1    Jul. 21, 2022

(30) Foreign Application Priority Data

Aug. 2, 2019  (JP) .................................. 2019-142641

(51) Int. Cl.
G01F 1/66        (2022.01)
G01F 1/667       (2022.01)
H04R 17/00       (2006.01)

(52) U.S. Cl.
CPC .............. *G01F 1/662* (2013.01); *G01F 1/668* (2013.01); *H04R 17/00* (2013.01)

(58) Field of Classification Search
None
See application file for complete search history.

(56) References Cited

U.S. PATENT DOCUMENTS

| | | |
|---|---|---|
| 5,343,109 A | 8/1994 | Möckl |
| 2001/0021807 A1* | 9/2001 | Saito ...................... G10K 11/02 600/459 |

(Continued)

FOREIGN PATENT DOCUMENTS

| | | |
|---|---|---|
| JP | 2003-163995 | 6/2003 |
| JP | 2004-072461 | 3/2004 |

(Continued)

OTHER PUBLICATIONS

International Search Report of PCT application No. PCT/JP2020/028821 dated Sep. 1, 2020.

*Primary Examiner* — Suman K Nath
(74) *Attorney, Agent, or Firm* — Wenderoth, Lind & Ponack, L.L.P.

(57) ABSTRACT

There are provided piezoelectric element, case having conductivity, first acoustic matching layer bonded on case, and second acoustic matching layer stacked on and bonded to first acoustic matching layer. A joining part between first acoustic matching layer and second acoustic matching layer is located inside an outer periphery of a joining surface of first acoustic matching layer that is joined to second acoustic matching layer. This configuration can prevent indirect wave generated in first acoustic matching layer from propagating to second acoustic matching layer, and can therefore reduce reverberation of an ultrasonic wave.

9 Claims, 12 Drawing Sheets

(56) References Cited

U.S. PATENT DOCUMENTS

| | | | | |
|---|---|---|---|---|
| 2003/0053915 A1* | 3/2003 | Keilman | ............... | F04B 35/00 |
| | | | | 417/322 |
| 2004/0113522 A1* | 6/2004 | Nagahara | ............... | G10K 11/02 |
| | | | | 310/326 |
| 2004/0124746 A1* | 7/2004 | Suzuki | ................. | G01F 1/662 |
| | | | | 310/326 |
| 2010/0066207 A1* | 3/2010 | Saito | ................ | G01S 15/8925 |
| | | | | 310/335 |
| 2010/0192702 A1* | 8/2010 | Satou | ................ | G01F 15/00 |
| | | | | 73/861.27 |
| 2011/0238333 A1* | 9/2011 | Miyata | ................ | G01F 15/00 |
| | | | | 702/48 |
| 2016/0146650 A1* | 5/2016 | Satou | ................ | G01F 1/662 |
| | | | | 73/861.25 |
| 2016/0187298 A1* | 6/2016 | Ko | ................... | G01N 29/245 |
| | | | | 29/25.35 |
| 2019/0025102 A1 | 1/2019 | Sugaya et al. | | |

FOREIGN PATENT DOCUMENTS

| | | |
|---|---|---|
| JP | 2004-144701 | 5/2004 |
| JP | 3552054 B | 8/2004 |
| JP | 2018-061209 | 4/2018 |
| WO | 2017/212511 | 12/2017 |

\* cited by examiner

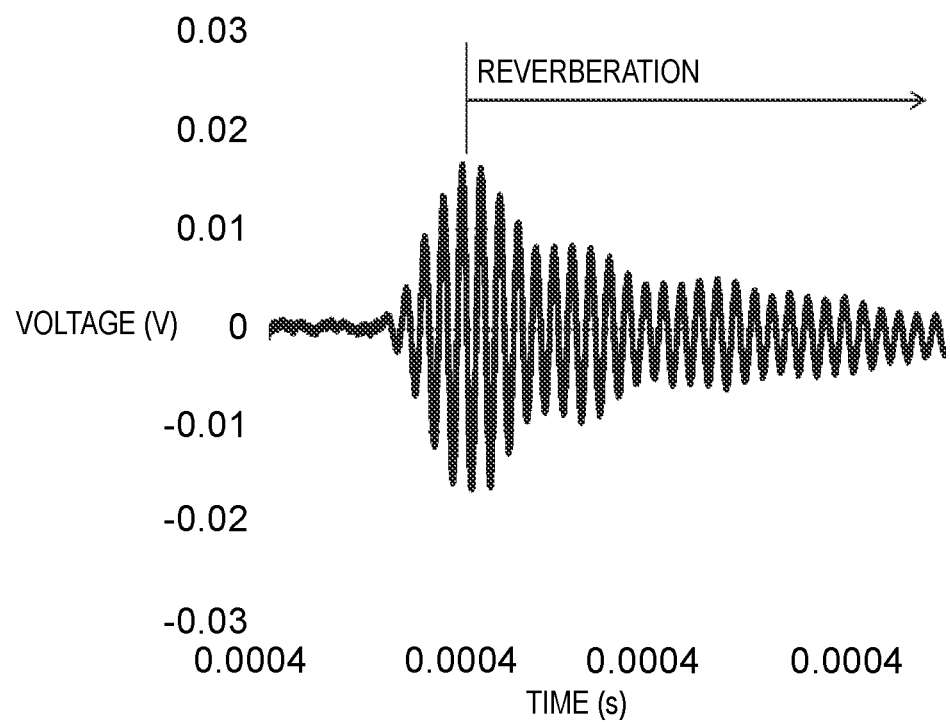

ULTRASONIC TRANSCEIVER INCLUDING PIEZOELECTRIC ELEMENT AND STACKED LAYERS OF A PLURALITY OF MATCHING LAYERS, AND ULTRASONIC FLOW METER HAVING THE ULTRASONIC TRANSCEIVER

CROSS-REFERENCE TO RELATED APPLICATIONS

This application is a U.S. national stage application of the PCT International Application No. PCT/JP2020/028821 filed on Jul. 28, 2020, which claims the benefit of foreign priority of Japanese patent application No. 2019-142641 filed on Aug. 2, 2019, the contents all of which are incorporated herein by reference.

TECHNICAL FIELD

The present disclosure relates to an ultrasonic transceiver that transmits and receives an ultrasonic wave by using a piezoelectric element or the like, and an ultrasonic flow meter using the same.

BACKGROUND ART

In recent years, an ultrasonic flow meter that measures a time taken for an ultrasonic wave to travel in a propagation path, thereby measuring a moving speed of a fluid, and consequently measures a flow rate has been being used for gas meters and the like. In an ultrasonic flow meter that performs flow rate measurement by measuring a propagation time of an ultrasonic wave, a pair of ultrasonic transceivers are generally disposed upstream and downstream of a measurement flow path through which a fluid to be measured flows, and the propagation time of the ultrasonic wave is measured by transmission and reception of an ultrasonic wave between the ultrasonic transceivers.

When the fluid to be measured is a gas, the difference in acoustic impedance between the gas and the piezoelectric element is large, and the ultrasonic wave is therefore easily reflected at an interface between the piezoelectric element and the gas. Therefore, in the ultrasonic transceiver, an acoustic matching layer is provided at the interface between the piezoelectric element and the gas in order to enable the ultrasonic wave to efficiently enter the gas from the piezoelectric element.

Further, in order to improve the radiation efficiency, there is used an acoustic matching layer configured by stacking a first acoustic matching layer having a high density and a high sound speed and a second acoustic matching layer having a lower density and a lower sound speed than the first acoustic matching layer. There is proposed an ultrasonic transceiver that can be matched with a gas having a sufficiently small acoustic impedance by arranging on the gas side a second acoustic matching layer that is acoustic impedance-matched with the gas, which is a fluid to be measured (for example, see PTL 1).

CITATION LIST

Patent Literature

PTL 1: Japanese Patent No. 3552054

SUMMARY OF THE INVENTION

However, in the conventional configuration, since a reverberation in the received wave of the ultrasonic wave is large, there is a possibility that a reference point for measuring a propagation time cannot be accurately detected and the gas flow rate is erroneously detected.

Next, a method of measuring a propagation time in an ultrasonic flow meter will be described with reference to FIGS. 9 and 10.

A conventional flow rate measurement device for a fluid of this type is generally a device as shown in FIG. 9. Flow rate measurement device 100 includes: first ultrasonic transceiver 102 and second ultrasonic transceiver 103 installed in flow path 101 through which a fluid to be measured flows; and switching unit 104 that switches first ultrasonic transceiver 102 and second ultrasonic transceiver 103 between transmission and reception. In addition, flow rate measurement device 100 includes: transmitter 105 that drives first ultrasonic transceiver 102 and second ultrasonic transceiver 103; and receiver 106 that receives a received signal that is received by the ultrasonic transceiver on the reception side and has passed through switching unit 104. Flow rate measurement device 100 further includes: amplifier 107 that amplifies the received signal to a predetermined amplitude; and reference comparator 108 that compares a voltage of the received signal amplified by amplifier 107 with a reference voltage.

Further, flow rate measurement device 100 includes: reference voltage setting unit 109 that sets the reference voltage to be compared by reference comparator 108; determination unit 110 that determines a reference point for measuring time on the basis of a comparison result of reference comparator 108; and time counter 111 that measures a propagation time of an ultrasonic wave on the basis of a result of determination unit 110. Flow rate measurement device 100 further includes: flow rate calculator 112 that calculates a flow rate of the fluid to be measured on the basis of the propagation time measured by time counter 111; and controller 113 that is configured with a microcomputer and the like and performs overall control.

Next, a method of measuring the propagation time of the ultrasonic wave by time counter 111 will be described with reference to FIG. 10. FIG. 10 illustrates a drive signal D of the ultrasonic transceiver (first ultrasonic transceiver 102 or second ultrasonic transceiver 103) assigned to a transmission side by switching unit 104, and further illustrates a received signal S that is received by the ultrasonic transceiver (first ultrasonic transceiver 102 or second ultrasonic transceiver 103) assigned to a reception side by switching unit 104 and that is amplified by amplifier 107 such that the maximum amplitude becomes a predetermined amplitude.

Reference comparator 108 compares the received signal S with a reference voltage Vr set by reference voltage setting unit 109, and determination unit 110 detects a zero-crossing point R1 of the received signal after the received signal S becomes larger than the reference voltage Vr.

Here, a reference voltage Vr is set to such a voltage that the third wave of the received signal S can be detected, but this setting is based on the following assumption: when amplifier 107 amplifies the received signal S such that the maximum amplitude of the received signal S becomes a predetermined amplitude, the amplitude of the third wave is also amplified by the same amplification factor, and also the third wave therefore becomes a voltage in a predetermined range.

Time counter 111 can calculate a propagation time TP0 by measuring a time TP from a start point T0 to the zero-crossing point R1 and by subtracting from the time TP a time TR that is from a reception start point R0 to the zero-crossing point R1.

Then, by switching between the transmission and the reception of first ultrasonic transceiver 102 and second ultrasonic transceiver 103 by using switching unit 104, it is possible to obtain, by the above-described method, a propagation time t1 from first ultrasonic transceiver 102 to second ultrasonic transceiver 103 and a propagation time t2 from second ultrasonic transceiver 103 to first ultrasonic transceiver 102.

Then, a flow rate Q can be obtained by the following equation, where v is a flow velocity of the fluid to be measured, S is a cross-sectional area of a flow path, φ is a sensor angle, and L is a propagation distance.

$$Q = S \cdot v = S \cdot L/2 \cdot \cos \varphi \cdot (n/t1 - n/t2) \quad \text{(Equation 1)}$$

Flow rate calculator 112 calculates the flow rate by further multiplying Equation 1 by a coefficient corresponding to the flow rate.

However, it has been found that when the ultrasonic transceiver having the conventional configuration is used as the ultrasonic transceiver, the waveform of the received signal is distorted due to reverberation, and thus the zero-crossing point R1 cannot be correctly detected in some cases.

FIGS. 11A and 11B each illustrate a configuration of a conventional ultrasonic transceiver. FIG. 11A is a cross-sectional view of ultrasonic transceiver 200, and FIG. 11B is a plan view of ultrasonic transceiver 200. In ultrasonic transceiver 200, piezoelectric element 202 is bonded to top face inner part 201a of metal sensor case 201 having a capped cylindrical shape. In addition, first acoustic matching layer 203 having a disk shape and second acoustic matching layer 204 having a disk shape having the same outer diameter as first acoustic matching layer 203 are stacked and joined to a top face outer part 201b of sensor case 201.

FIG. 12 illustrates an example of a received waveform in a case where ultrasonic transceiver 200 is used. As illustrated in FIG. 12, relatively large reverberation waves are seen after a normal maximum amplitude A, and in some cases, an amplitude B that is equivalent to the maximum amplitude A or may be larger than the maximum amplitude A is generated.

The waveform of the ultrasonic wave transmitted and received by the ultrasonic transceiver is mainly affected by a thickness and shape of the piezoelectric element, a material, thickness, and shape of the sensor case, shapes, thicknesses, and acoustic impedances of the first acoustic matching layer and the second acoustic matching layer, and the like.

Further, it has been found from our study that the received ultrasonic waveform illustrated in FIG. 12 is affected by the shapes in the surface direction of the acoustic matching layers. In a case where an area of a joining surface of first acoustic matching layer 203 is the same as an area of a joining surface of second acoustic matching layer 204 as in ultrasonic transceiver 200 illustrated in FIG. 11A, or in a case where the area of the joining surface of second acoustic matching layer 204 is larger than the area of the joining surface of first acoustic matching layer 203, the following phenomenon occurs. That is, the ultrasonic wave radiated to the fluid to be measured generates direct wave 205 in which a vibration of piezoelectric element 202 propagates to the fluid to be measured by the shortest distance via sensor case 201, first acoustic matching layer 203, and second acoustic matching layer 204. In addition, the vibration of piezoelectric element 202 propagates in a circumferential direction of first acoustic matching layer 203, and indirect wave 206 having a phase delay is generated by reflection by joint part 207 between first acoustic matching layer 203 and second acoustic matching layer 204, and by other causes. The vibration of piezoelectric element 202 is a combination of direct wave 205 and indirect wave 206, and indirect wave 206 is considered to generate reverberation.

Note that indirect wave 206 illustrated in FIG. 11A is schematically illustrated, and the illustrated propagation paths are not limitative.

When the position of the maximum amplitude varies due to the influence of such a large reverberation wave as described above, the third wave to be detected does not have an assumed amplitude even if amplifier 107 amplifies the maximum amplitude to have the predetermined amplitude. Therefore, the preceding and following second and fourth waves are detected, and the correct propagation time cannot be measured. That is, the propagation times t1 and t2 in Equation 1 cannot be accurately measured, and a measurement accuracy of the flow rate decreases.

For example, in the received waveform illustrated in FIG. 12, when the amplitude B becomes larger than the normal maximum amplitude A, amplifier 107 amplifies the received signal such that the amplitude B becomes the predetermined amplitude. Then, the third wave originally desired to be detected is not amplified to the reference voltage or more, and reference comparator 108 therefore detects the fourth wave.

The present disclosure enables stable measurement of an ultrasonic signal by suppressing reverberation of a received ultrasonic waveform.

An ultrasonic transceiver of the present disclosure includes a piezoelectric element and a plurality of acoustic matching layers stacked on and joined to the piezoelectric element directly or via another layer, where at least a part of a joining part between the acoustic matching layers is inside an outer periphery of a joining surface of the acoustic matching layer disposed on a piezoelectric element side.

With this configuration, it is possible to suppress propagation of the indirect wave from the acoustic matching layer on the piezoelectric element side to the next acoustic matching layer, and when this ultrasonic transceiver is used as an ultrasonic flow meter, a reverberation level of the ultrasonic transceiver can be reduced, and stable measurement of the propagation time of the ultrasonic wave can be achieved.

The ultrasonic transceiver of the present disclosure can reduce the reverberation of the received ultrasonic waveform, and erroneous measurement of the propagation time in flow rate measurement can be reduced, thereby achieving stable flow rate measurement.

BRIEF DESCRIPTION OF DRAWINGS

FIG. 2 is an image diagram of a received waveform of an ultrasonic transceiver in the first exemplary embodiment.

DESCRIPTION OF EMBODIMENTS

Hereinafter, exemplary embodiments will be described in detail with reference to the drawings. However, unnecessarily detailed description is omitted in some cases. For example, a detailed description of already well-known matters and a redundant description of substantially the same configuration is omitted in some cases.

Note that the attached drawings and the following description are provided for those skilled in the art to fully understand the present disclosure, and are not intended to limit the subject matter as described in the appended claims.

First Exemplary Embodiment

Figure 1A:
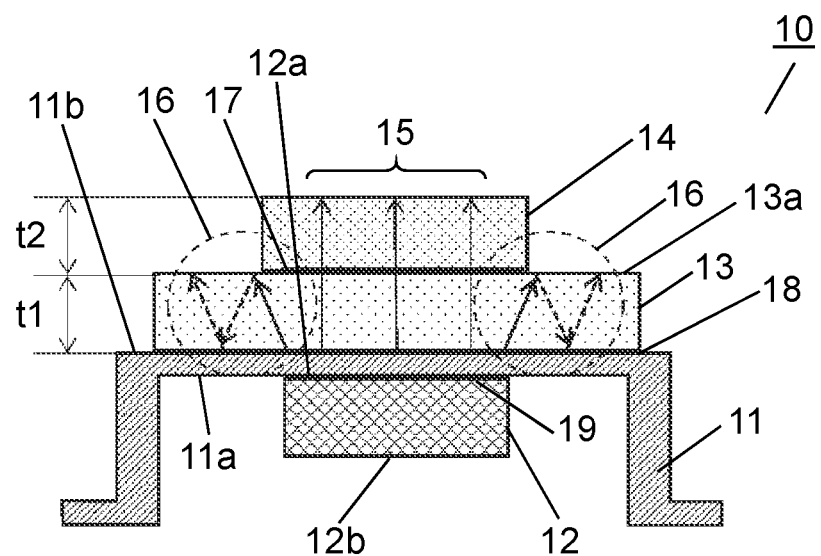
FIG. 1A is a cross-sectional view of an ultrasonic transceiver in a first exemplary embodiment.
Figure 1B:
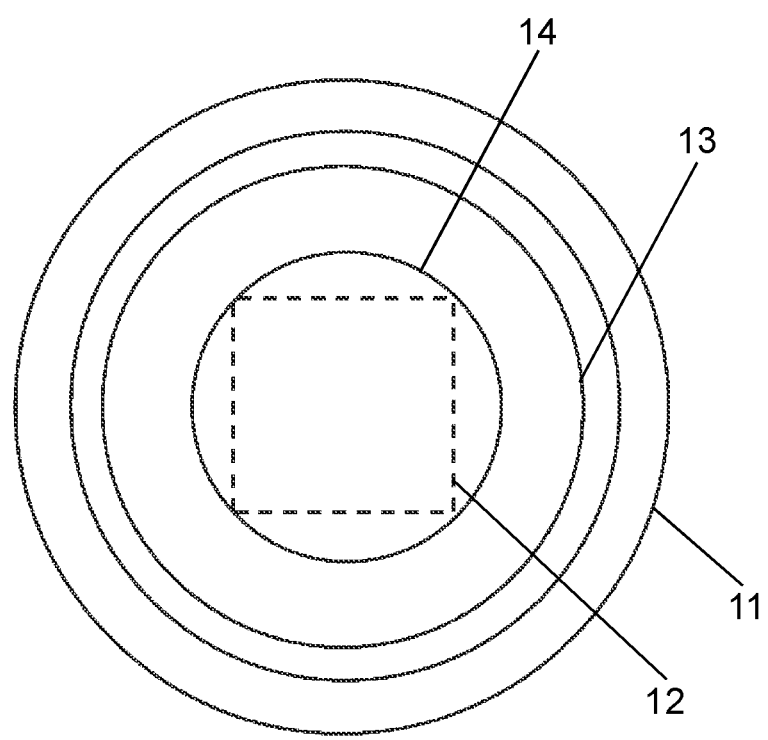
FIG. 1B is a plan view of the ultrasonic transceiver in the first exemplary embodiment.

FIG. 1A is a cross-sectional view of an ultrasonic transceiver in a first exemplary embodiment. FIG. 1B is a plan view of the ultrasonic transceiver in the first exemplary embodiment.

With reference to FIGS. 1A and 1B, ultrasonic transceiver 10 includes case 11 having conductivity and a capped cylindrical shape, piezoelectric element 12 joined to top face inner part 11a of case 11 via joining part 19, first acoustic matching layer 13 joined to top face outer part 1ib of case 11 via joining part 18, and second acoustic matching layer 14 joined to first acoustic matching layer 13 via joining part 17.

Electrodes 12a and 12b are provided on opposite surfaces of piezoelectric element 12, electrode 12a is conductively joined to case 11 via joining part 19, and when an AC voltage is applied across electrode 12b and case 11, piezoelectric element 12 is deformed according to the voltage. The deformation generated in piezoelectric element 12 propagates to a fluid to be measured via first acoustic matching layer 13 and second acoustic matching layer 14.

In the present exemplary embodiment, both first acoustic matching layer 13 and second acoustic matching layer 14 have a disk shape, a diameter of second acoustic matching layer 14 is smaller than a diameter of first acoustic matching layer 13, and first acoustic matching layer 13 and second acoustic matching layer 14 are concentrically stacked. With this configuration, joining part 17 between first acoustic matching layer 13 and second acoustic matching layer 14 is located inside an outer periphery of joining surface 13a of first acoustic matching layer 13 bonded on a side of piezoelectric element 12.

In this arrangement, as illustrated in FIG. 1A, in ultrasonic transceiver 10 of the present exemplary embodiment, direct wave 15 that is a part of the ultrasonic wave radiated to the fluid to be measured is mainly propagated to the fluid to be measured, but the ultrasonic wave other than direct wave 15 attenuates because first acoustic matching layer 13 and the fluid to be measured are not matched. Therefore, it is possible to suppress propagation of indirect waves 16 to the fluid to be measured.

Note that indirect waves 16 illustrated in FIG. 1A are schematically illustrated, and these propagation paths of indirect waves 16 are not limitative.

Figure 11A:
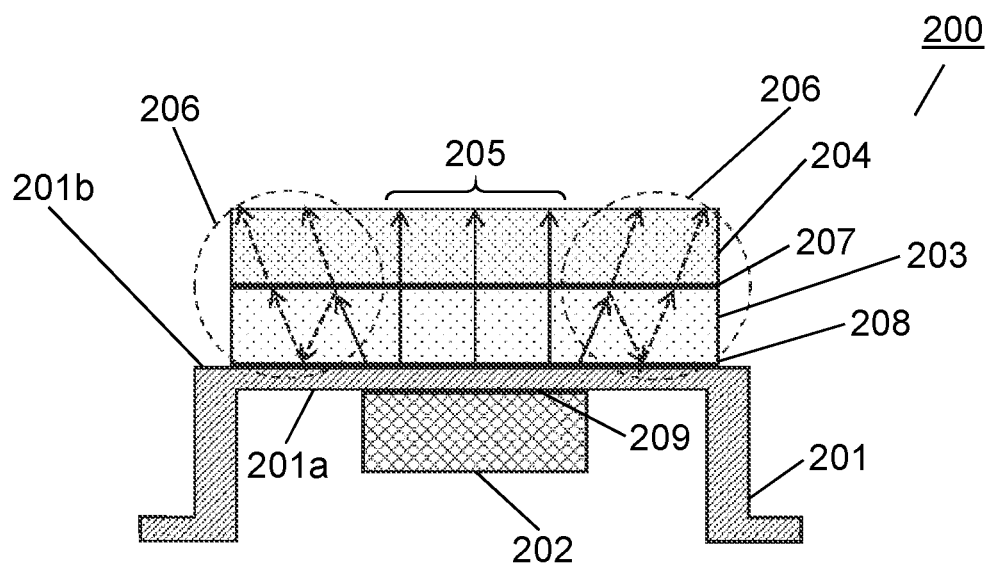
FIG. 11A is a cross-sectional view of the conventional ultrasonic transceiver.
Figure 11B:
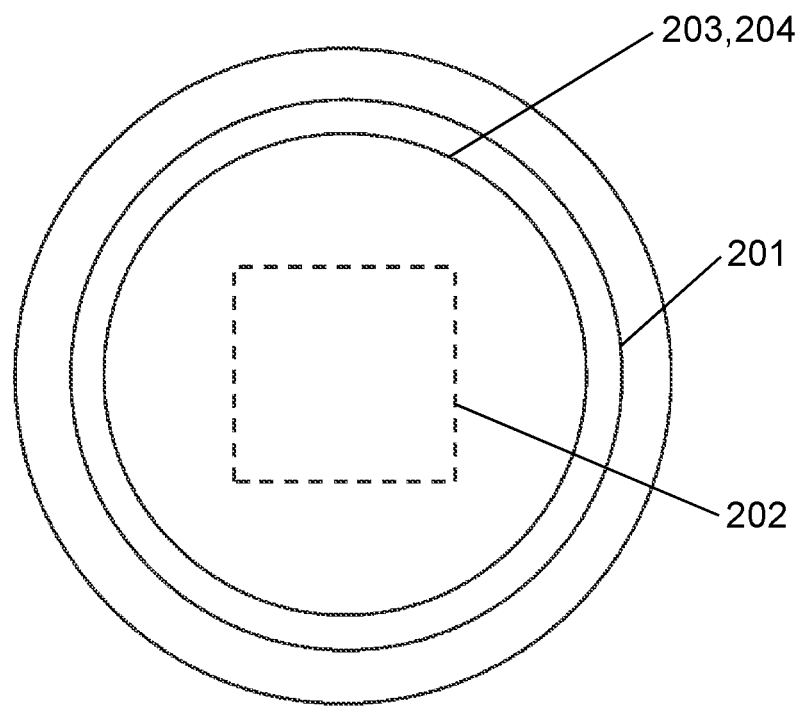
FIG. 11B is a plan view of the conventional ultrasonic transceiver.
Figure 12:
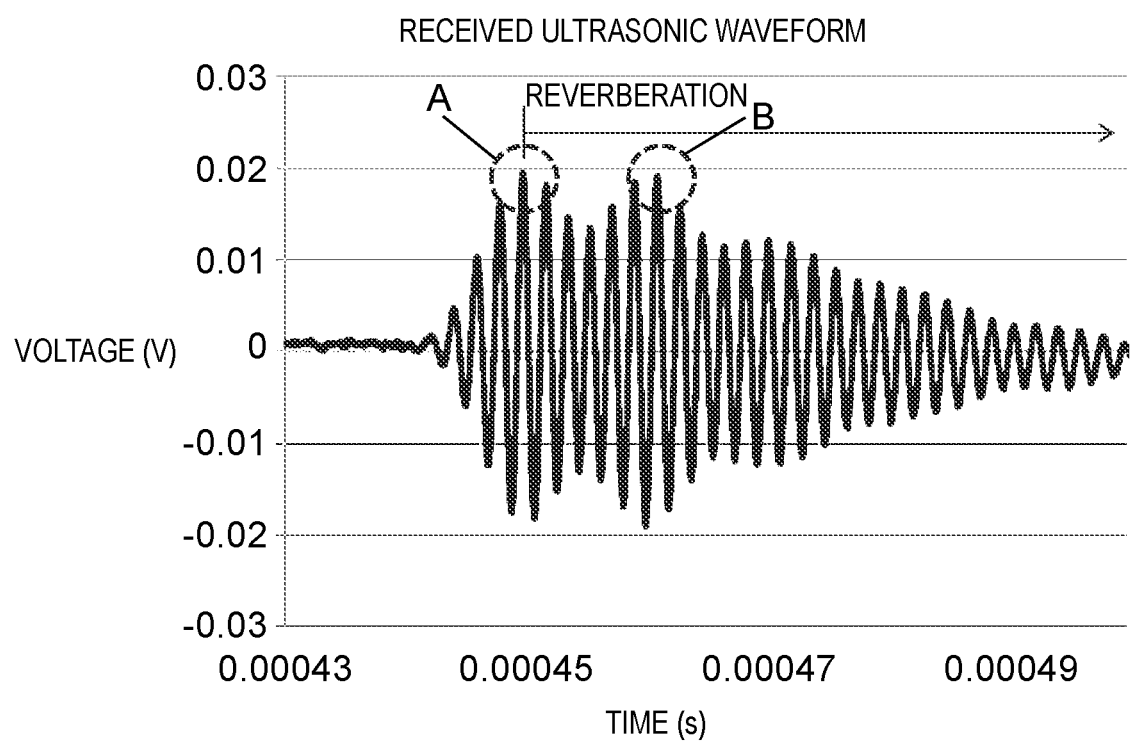
FIG. 12 is an image view illustrating a received waveform of the conventional ultrasonic transceiver.

FIG. 2 is an image diagram of a received waveform of the ultrasonic transceiver in the first exemplary embodiment. As illustrated in the drawing, it can be seen that a reverberation part attenuates more rapidly than the conventional received wave illustrated in FIG. 11.

Figure 9:
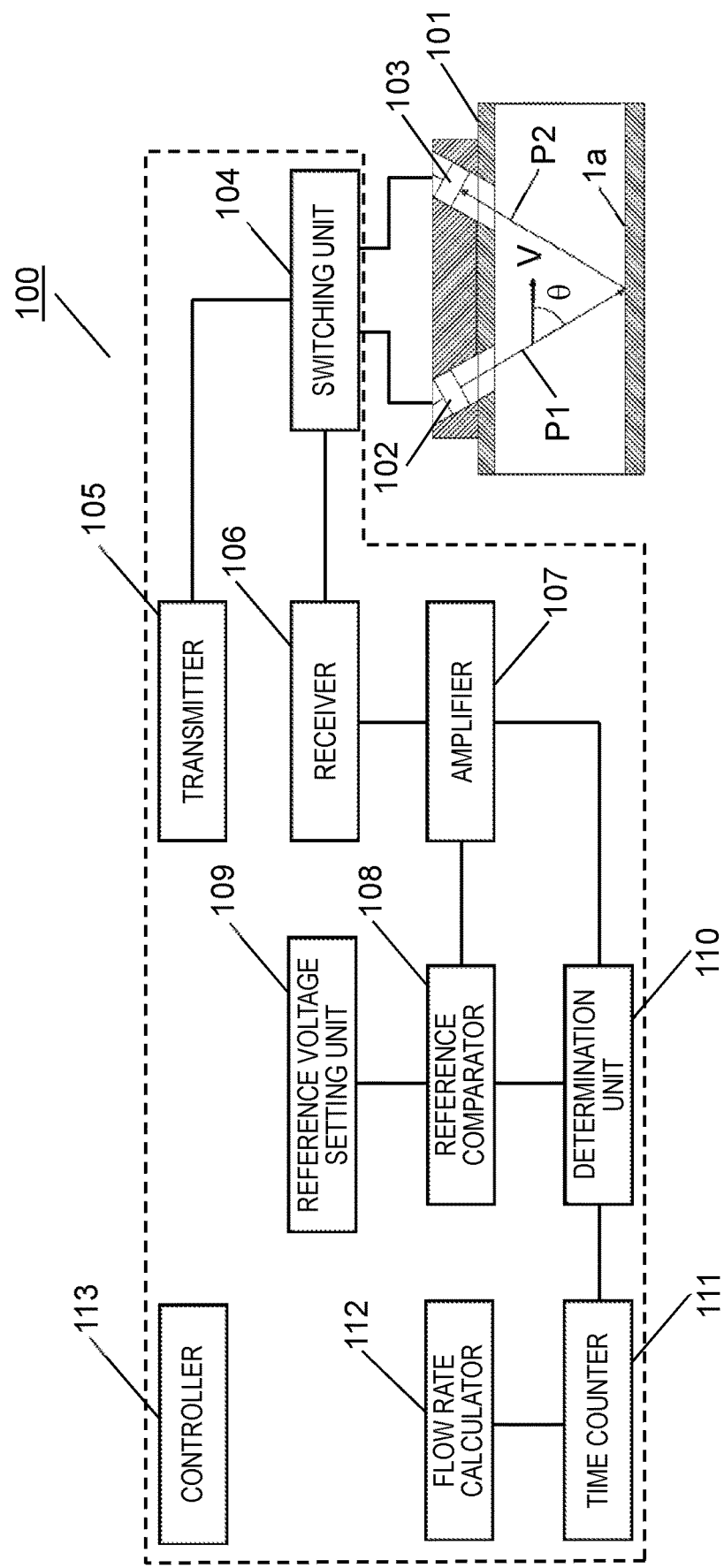
FIG. 9 is a block diagram illustrating a configuration of a conventional ultrasonic flow meter.
Figure 10:
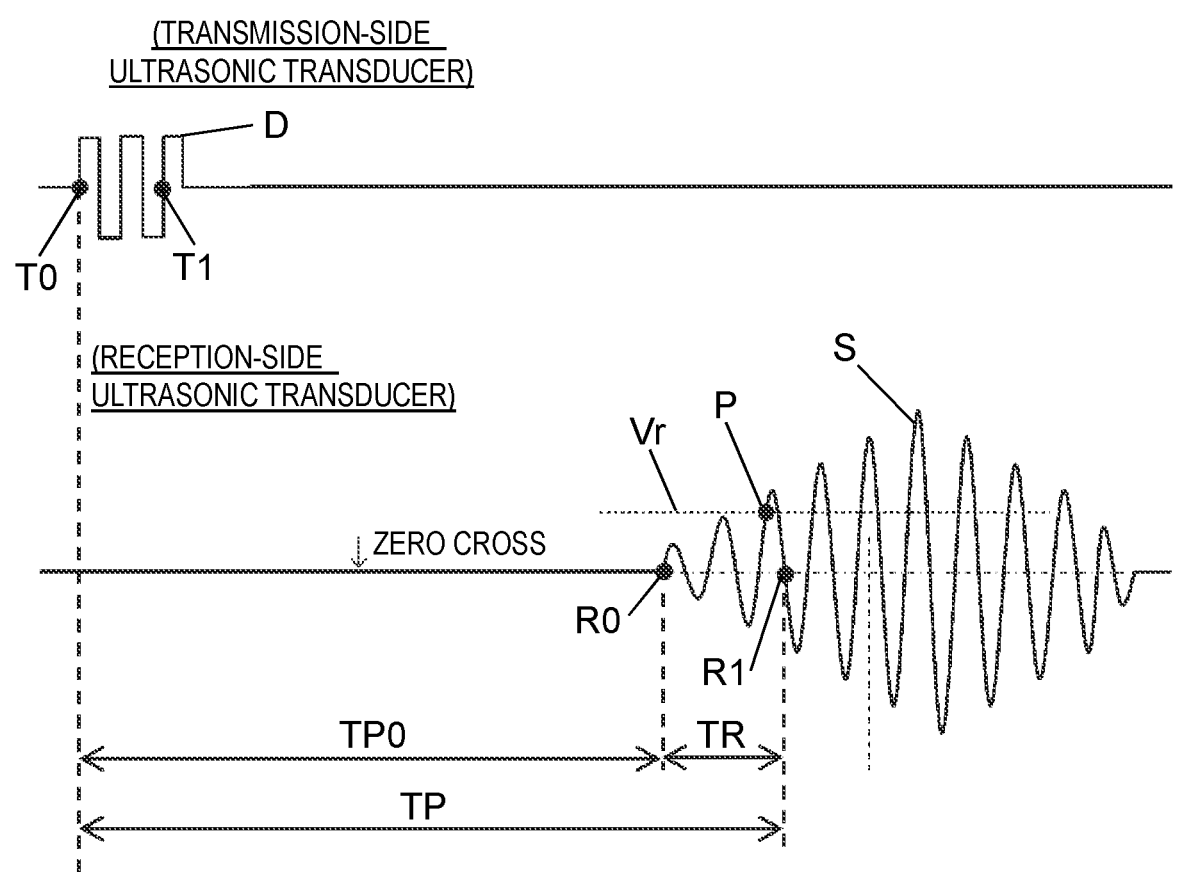
FIG. 10 is an image diagram of a drive wave and a received wave for describing a method of measuring a propagation time in a conventional ultrasonic flow meter.

As described above, an influence of the reverberation wave can be suppressed by ultrasonic transceiver 10 of the present exemplary embodiment; therefore, by using ultrasonic transceiver 10 of the present exemplary embodiment for the ultrasonic flow meter illustrated in FIG. 9, amplifier 107 can amplify an ultrasonic wave such that the maximum amplitude becomes the predetermined amplitude, the third wave to be detected therefore becomes to have the assumed amplitude, and the correct propagation time can be measured.

Note that a thickness t1 of first acoustic matching layer 13 and a thickness t2 of second acoustic matching layer 14 illustrated in FIG. 1A preferably have a thickness of about ¼ of a wavelength of the sound wave propagating in the acoustic matching layers. Assuming that a frequency for driving the ultrasonic transceiver is f and a sound velocity in the acoustic matching layer is V, a wavelength Λ of the sound wave is obtained by λ=V/f. Therefore, a thickness d of the acoustic matching layer is obtained by d=1/4·λ. With such a structure, it is possible to align phases of ultrasonic waves reflected inside the sensor and to efficiently transmit and receive ultrasonic waves.

In order to efficiently propagate the vibration of piezoelectric element 12 to the fluid, it is important to match the acoustic impedances. In the present exemplary embodiment, first acoustic matching layer 13 is attached to top face outer part 1ib of case 11, and second acoustic matching layer 14 is joined to first acoustic matching layer 13. Assuming that an acoustic impedance of first acoustic matching layer 13 is Za and an acoustic impedance of second acoustic matching layer 14 is Zb, a relationship of Za>Zb is satisfied. The impedance Za is smaller than the acoustic impedance of piezoelectric element 12. Since the plurality of acoustic matching layers having such acoustic characteristics are provided, the vibration of the piezoelectric element can be efficiently propagated into the fluid to be measured.

(Variations)

Figure 3A:
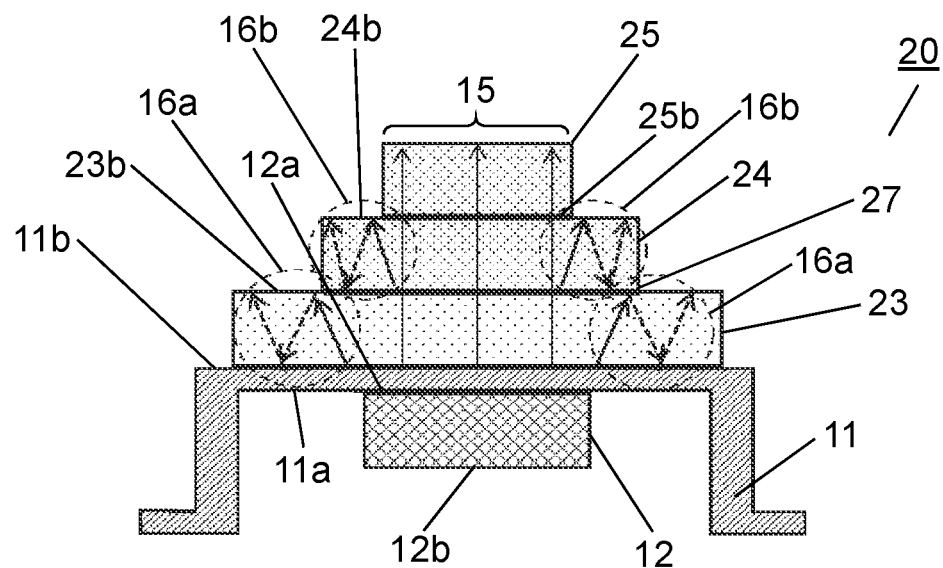
FIG. 3A is a cross-sectional view illustrating a variation of the ultrasonic transceiver in the first exemplary embodiment.
Figure 3B:
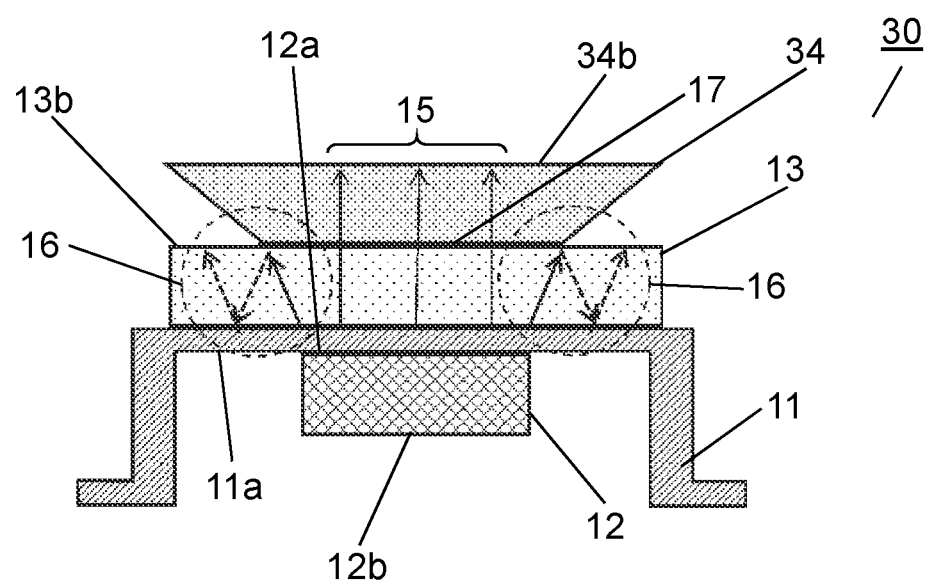
FIG. 3B is a cross-sectional view illustrating a variation of the ultrasonic transceiver in the first exemplary embodiment.
Figure 4A:
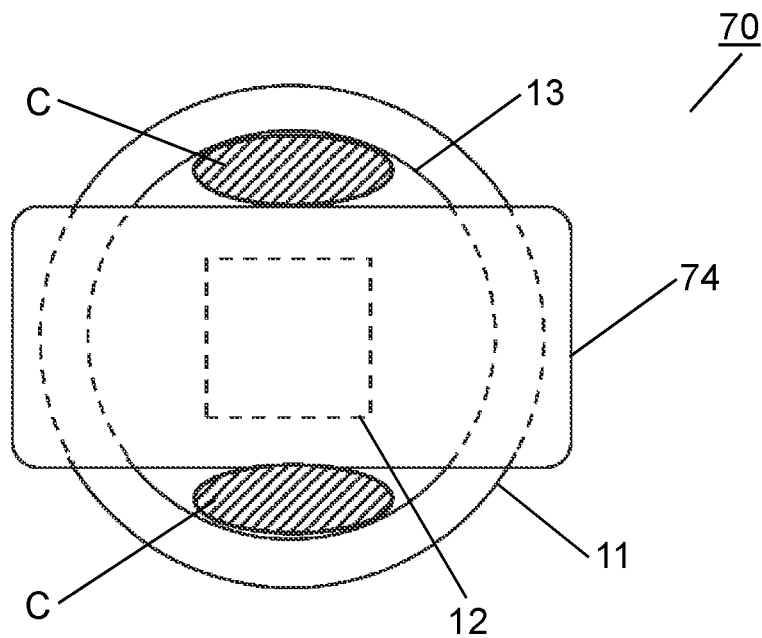
FIG. 4A is a plan view illustrating a variation of the ultrasonic transceiver in the first exemplary embodiment.
Figure 4B:
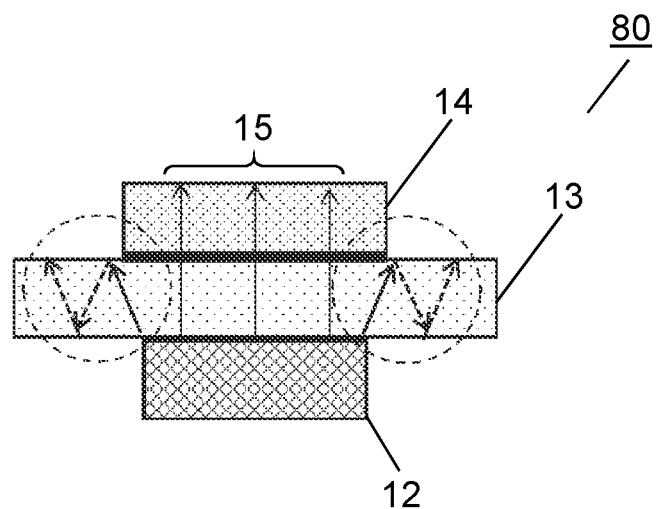
FIG. 4B is a cross-sectional view illustrating a variation of the ultrasonic transceiver in the first exemplary embodiment.

FIG. 3A is a cross-sectional view illustrating a variation of the ultrasonic transceiver in the first exemplary embodiment. FIG. 3B is a cross-sectional view illustrating a variation of the ultrasonic transceiver in the first exemplary embodiment. FIG. 4A is a plan view illustrating a variation of the ultrasonic transceiver in the first exemplary embodiment. FIG. 4B is a cross-sectional view illustrating a variation of the ultrasonic transceiver in the first exemplary embodiment.

In order to achieve matching with a substance which is a fluid to be measured and to which an ultrasonic wave is propagated, it is known to stack a plurality of acoustic matching layers (not limited to two layers), and FIG. 3A illustrates a side cross-sectional view of ultrasonic transceiver 20, where first acoustic matching layer 23, second acoustic matching layer 24, and third acoustic matching layer 25 are stacked in this order as an acoustic matching layer and are joined to top face outer part lib of case 11, so that the acoustic matching layer is formed as three layers.

In ultrasonic transceiver 20, joining part 27 between first acoustic matching layer 23 and second acoustic matching layer 24 is located inside an outer periphery of joining surface 23b of first acoustic matching layer 23. Further, joining part 25b between second acoustic matching layer 24 and third acoustic matching layer 25 is located inside an outer periphery of joining surface 24b of second acoustic matching layer 24. With this configuration, it is possible to reduce propagation of indirect waves 16a, 16b from piezoelectric element 12 to third acoustic matching layer 25, and the reverberation can therefore be suppressed.

Similarly, also in a case where more than three acoustic matching layers are provided, when a joining part of an acoustic matching layer is located on an inner side of a joining surface inside an outer periphery of a joining surface of an acoustic matching layer disposed on the piezoelectric element side, it is possible to suppress the propagation of indirect waves 16 (16a, 16b), and the reverberation can therefore be suppressed.

FIG. 3B illustrates a side cross-sectional view of ultrasonic transceiver 30. Instead of second acoustic matching layer 14 in ultrasonic transceiver 10 illustrated in FIG. 1A, second acoustic matching layer 34 having a truncated cone shape is used. In ultrasonic transceiver 30, an area of radiation surface 34b of second acoustic matching layer 34 through which an ultrasonic wave propagates is substantially the same as an area of the joining surface 13b of first acoustic matching layer 13; however, since joining part 17 between first acoustic matching layer 13 and second acoustic matching layer 34 is located inside joining surface 13b of first acoustic matching layer 13, it is possible to avoid the propagation of indirect waves 16 to second acoustic matching layer 34, and the reverberation can therefore be suppressed.

FIG. 4A illustrates a plan view of ultrasonic transceiver 70, and second acoustic matching layer 74 is used in which a shape of a matching surface (a radiation surface of an ultrasonic wave) of second acoustic matching layer 14 in ultrasonic transceiver 10 illustrated in FIG. 1A is changed from a circle to a rectangle and in which a length in a short-side direction is shorter than a diameter of first acoustic matching layer 13. In ultrasonic transceiver 70, regardless of a length in a long-side direction of second acoustic matching layer 74, it is possible to avoid the propagation of a phase-delayed indirect wave from side parts C of first acoustic matching layer 13 to second acoustic matching layer 74, and the reverberation can therefore be suppressed.

FIG. 4B illustrates a side cross-sectional view of ultrasonic transceiver 80, in which case 11 of ultrasonic transceiver 10 illustrated in FIG. 1A is removed and first acoustic matching layer 13 is directly joined to piezoelectric element 12. Also in this case, it is possible to reduce the propagation of ultrasonic waves other than direct wave 15 from piezoelectric element 12 to second acoustic matching layer 14, and the reverberation can therefore be suppressed.

As described above, with the ultrasonic transceivers according to the present exemplary embodiment, at least a part of the joining part between the acoustic matching layers is located inside the outer periphery of the joining surface of the acoustic matching layer disposed on the piezoelectric element side, so that the reverberation can therefore be suppressed.

Note that, in the present exemplary embodiment, various configurations are illustrated as examples by FIGS. 3A, 3B, 4A, and 4B, but it is needless to say that when at least a part of the entire periphery of the joining part is located inside the outer periphery of the joining surface of the acoustic matching layer disposed on the piezoelectric element side, it is possible to reduce the propagation of the ultrasonic wave other than the direct wave from the piezoelectric element to the next acoustic matching layer; and the shape of the acoustic matching layer can be appropriately selected.

In addition, in order to suppress the propagation of the indirect wave to the next acoustic matching layer, it needless to say that the entire joining part between the acoustic matching layers are preferably located inside the outer periphery of the joining surface of the acoustic matching layer disposed on the piezoelectric element side.

Second Exemplary Embodiment

Next, an ultrasonic flow meter using the ultrasonic transceiver described in the first exemplary embodiment will be described with reference to FIGS. 5, 6, and 7.

Figure 5A:
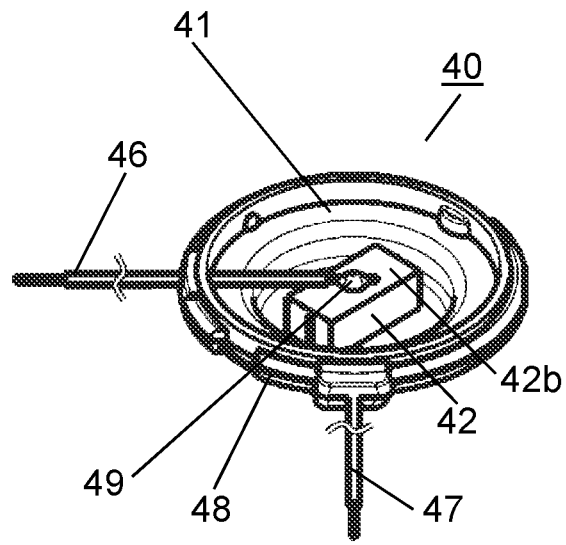
FIG. 5A is a perspective view of an ultrasonic transceiver used for an ultrasonic flow meter in a second exemplary embodiment.
Figure 5B:
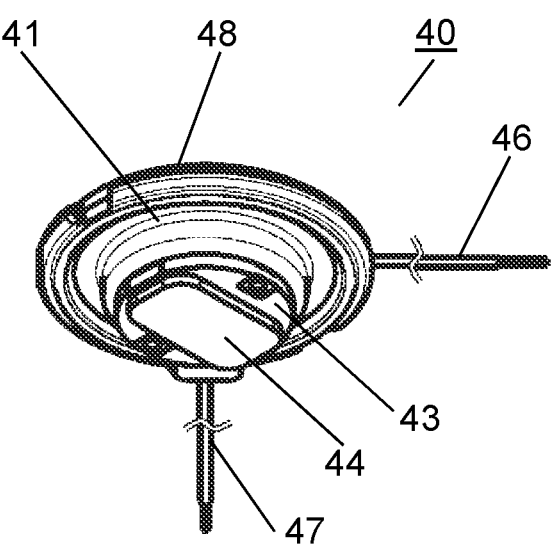
FIG. 5B is a perspective view of the ultrasonic transceiver used for the ultrasonic flow meter in the second exemplary embodiment.
Figure 5C:
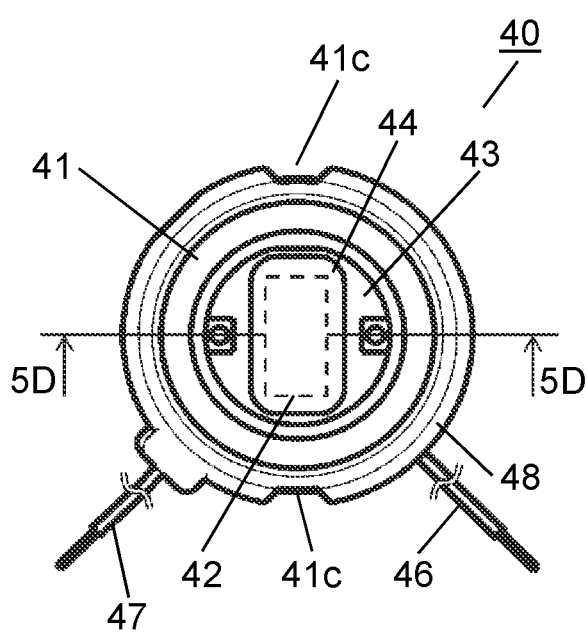
FIG. 5C is a plan view of the ultrasonic transceiver used for the ultrasonic flow meter in the second exemplary embodiment.
Figure 5D:
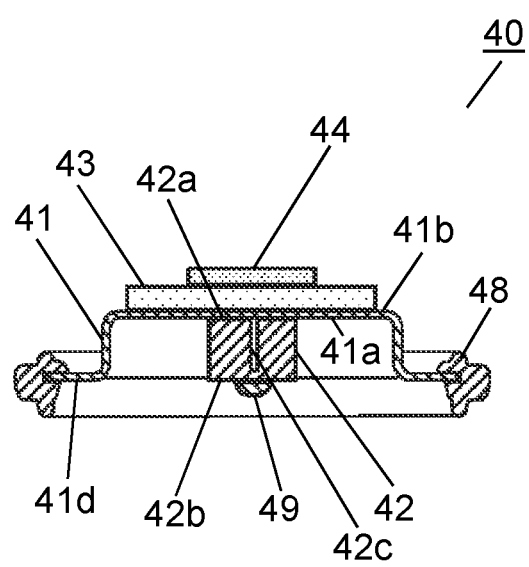
FIG. 5D is a cross-sectional view taken along line 5D-5D of FIG. 5C.

FIG. 5A is a perspective view of an ultrasonic transceiver used for an ultrasonic flow meter in a second exemplary embodiment. FIG. 5B is a perspective view of the ultrasonic transceiver used for the ultrasonic flow meter in the second exemplary embodiment. FIG. 5C is a plan view of the ultrasonic transceiver used for the ultrasonic flow meter in the second exemplary embodiment. FIG. 5D is a cross-sectional view taken along line 5D-5D of FIG. 5C.

As illustrated in the drawings, in ultrasonic transceiver 40, electrode surface 42a of piezoelectric element 42 is conductively joined to top part inner side 41a of metal case 41 having a capped cylindrical shape, and lead wire 46 is joined to electrode surface 42b by solder 49. In addition, lead wire 47 is joined to case 41 by welding, and piezoelectric element 42 vibrates at a predetermined frequency by applying an AC voltage to lead wire 46 and lead wire 47.

Flange 41d is formed at an open end of case 41, and vibration-proof member 48 is integrally formed, by molding, on an outer periphery of flange 41d. Lead wire 46 and lead wire 47 are held by case 41 by vibration-proof member 48.

Disk-shaped first acoustic matching layer 43 having a diameter of 10.8 mm is joined to top part outer side 41b of case 41, and second acoustic matching layer 44 is joined to first acoustic matching layer 43. Here, second acoustic matching layer 44 is made to have a substantially rectangular shape with a long-side length of 9.5 mm and a short-side length of 5.5 mm such that second acoustic matching layer 44 is joined to first acoustic matching layer 43 inside an outer periphery of a joining surface of first acoustic matching layer 43. Note that thicknesses of first acoustic matching layer 43 and second acoustic matching layer 44 are set to optimum values, as described above, depending on the frequency of the ultrasonic wave to be propagated.

Piezoelectric element 42 has a rectangular parallelepiped shape, and the joining surface via which piezoelectric element 42 and case 41 are joined together is configured to be smaller than an outer diameter of second acoustic matching layer 44. In addition, piezoelectric element 42 is disposed such that a longitudinal direction of piezoelectric element 42 coincides with a longitudinal direction of second acoustic matching layer 44. Further, piezoelectric element 42 has slit 42c to improve an excitation efficiency in a longitudinal vibration mode.

Further, in flange 41d, a pair of recesses 41c for positioning are formed at parts of the outer periphery of flange 41d that are in the longitudinal direction of second acoustic matching layer 44.

Figure 6A:
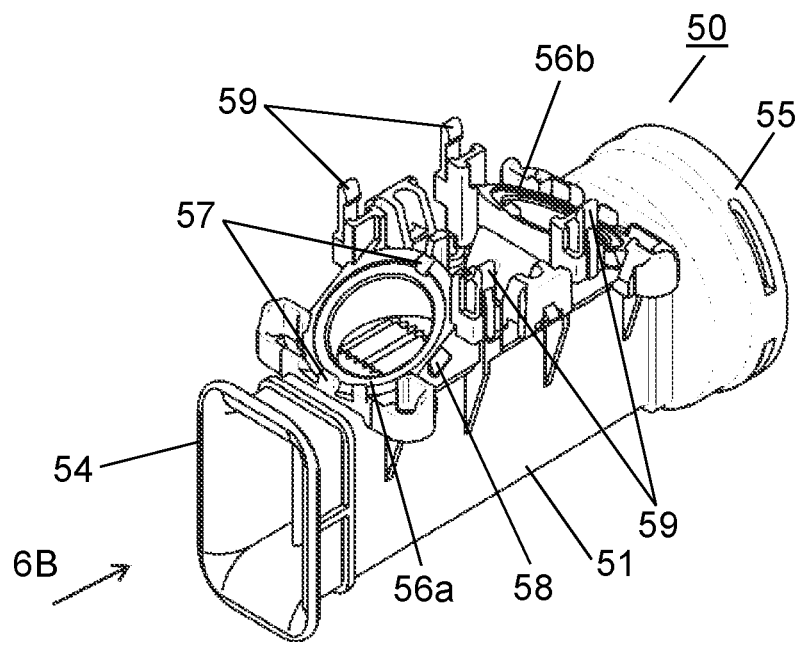
FIG. 6A is a perspective view of a flow path block used for the ultrasonic flow meter in the second exemplary embodiment.
Figure 6B:
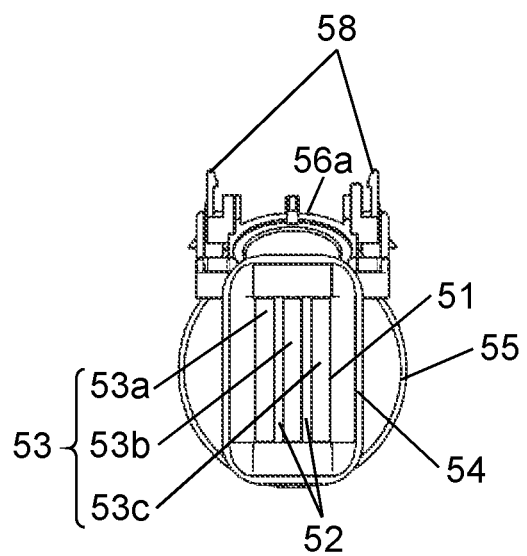
FIG. 6B is a view taken in a direction of arrow 6B of FIG. 6A.
Figure 6C:
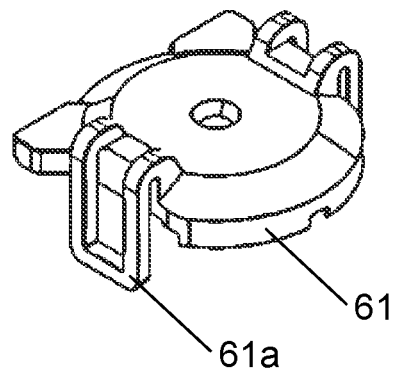
FIG. 6C is a perspective view of a sensor fixing member used for the ultrasonic flow meter in the second exemplary embodiment.

FIG. 6A is a perspective view of the flow path block used for the ultrasonic flow meter in the second exemplary embodiment. FIG. 6B is a view taken in a direction of arrow 6B in FIG. 6A. FIG. 6C is a perspective view of a sensor fixing member used for the ultrasonic flow meter in the second exemplary embodiment.

As illustrated in FIGS. 6A, 6B, and 6C, flow path block 50 includes measurement flow path 51 which has a cylindrical shape and has a rectangular cross-section and through which a fluid to be measured flows. Measurement flow path 51 is divided into three divided flow paths 53 (first divided flow path 53a, second divided flow path 53b, and third divided flow path 53c) by two partition plates 52 arranged in parallel along a flow direction of the fluid to be measured, so that a multilayer flow path is formed as a whole. Further, flow path block 50 has inlet 54 and outlet 55 for the fluid to be measured.

Flow path block 50 further includes: upstream-side sensor mounting portion 56a and downstream-side sensor mounting portion 56b each having an opening for mounting the ultrasonic transceiver; positioning projections 57 for the time of mounting the ultrasonic transceivers; locking portions 58 for sensor fixing members to be described later; and locking portions 59 for a circuit board.

Figure 7A:
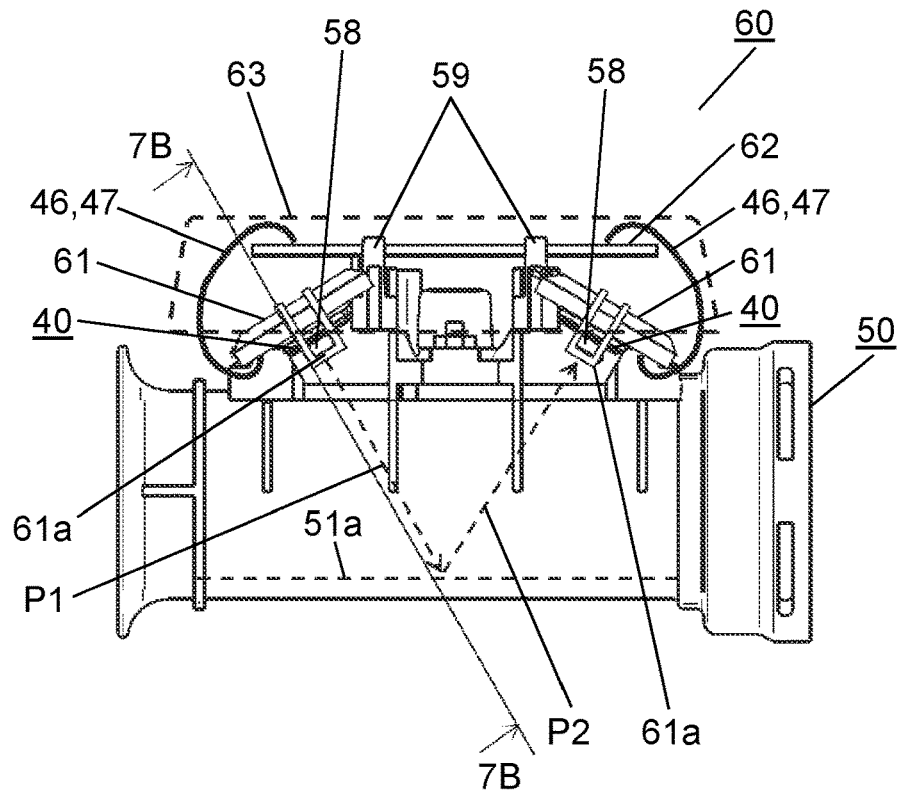
FIG. 7A is a side view of an ultrasonic flow meter in the second exemplary embodiment.

FIG. 7A is a side view of the ultrasonic flow meter in the second exemplary embodiment. As illustrated in FIG. 7A, in ultrasonic flow meter 60, a pair of ultrasonic transceivers 40 are mounted on upstream-side sensor mounting portion 56a and downstream-side sensor mounting portion 56b of flow path block 50. Here, after ultrasonic transceivers 40 are mounted such that recesses 41c (see FIG. 5C) are positioned at positioning projections 57 (see FIG. 6A), hinges 61a (see FIG. 6C) of sensor fixing members 61 (see FIG. 6C) are engaged with locking portions 58 provided on flow path block 50, so that the ultrasonic transceivers are pressed against and fixed to upstream-side sensor mounting portion 56a (see FIG. 6A) and downstream-side sensor mounting portion 56b (see FIG. 6A).

Figure 7B:
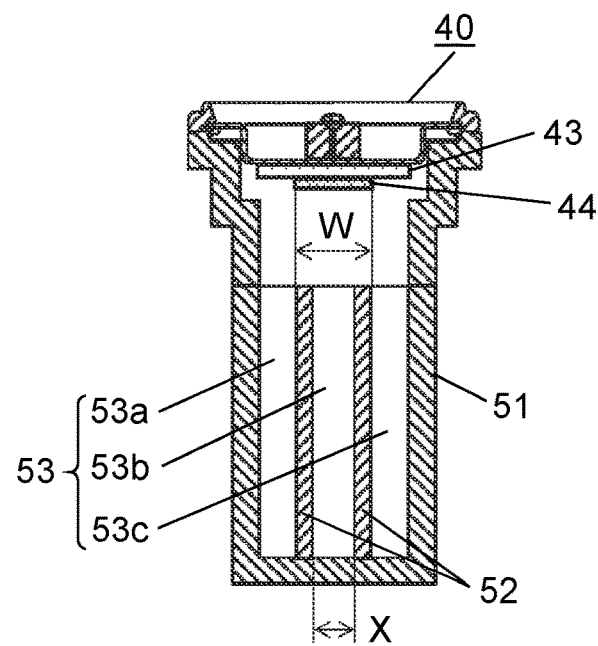
FIG. 7B is a main-part cross-sectional view taken along line 7B-7B of FIG. 7A.

FIG. 7B is a main-part cross-sectional view taken along line 7B-7B of FIG. 7A. FIG. 7B illustrates the relationship between second acoustic matching layer 44 and partition plates 52. As illustrated in the drawing, second acoustic matching layer 44 is disposed at a position facing second divided flow path 53b of the multilayer flow path, and a width W (short-side length) of second acoustic matching layer 44 is made to be matched with outer sides of two partition plates 52 and is made to be larger than a distance X (2.9 mm) between the partition plates.

Figure 8:
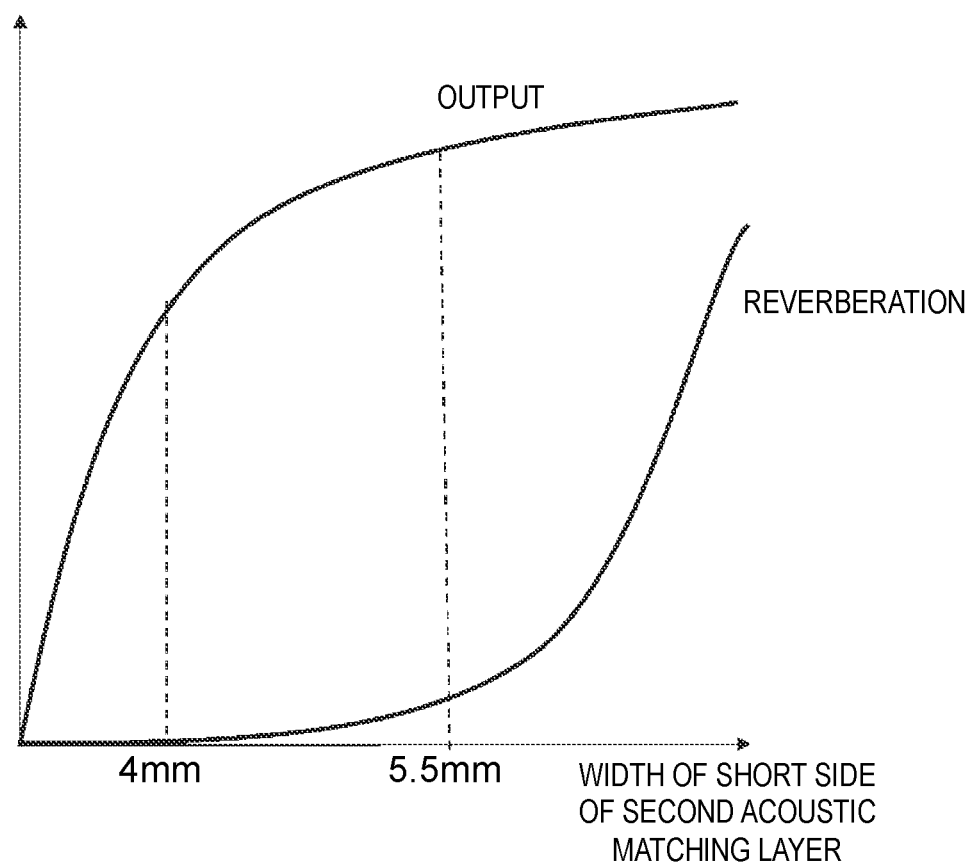
FIG. 8 is a graph for illustrating a width of a short side of a second acoustic matching layer, an output of an ultrasonic wave, and a magnitude of reverberation in the second exemplary embodiment.

FIG. 8 is a graph for illustrating a width of a short side of a second acoustic matching layer, an output of an ultrasonic wave, and a magnitude of reverberation in the second exemplary embodiment. The graph illustrated in FIG. 8 is an image in which the horizontal axis represents the width of the short side of second acoustic matching layer 44, and the output of the ultrasonic signal and the magnitude of the reverberation are shown as a graph. As illustrated in the drawing, the output increases as the width of second acoustic matching layer 44 increases, but the reverberation increases after the width reaches a certain size, so that the optimum dimension is determined to be 5.5 mm.

As described above, by setting the width (short-side length) of second acoustic matching layer 44 to be inside the outer periphery of the joining surface of first acoustic matching layer 43, it is possible to prevent the wave reflected on the side surface of first acoustic matching layer 43 from propagating to second acoustic matching layer 44, and it is possible to suppress the reverberation of the ultrasonic signal and to efficiently propagate the ultrasonic signal to second divided flow path 53b, which is at the center.

Circuit board 62 including a drive circuit for ultrasonic transceivers 40 and a measurement circuit that measures the propagation time to calculate the flow velocity and the flow rate of the fluid to be measured is placed on an upper part of flow path block 50 and is locked by locking portion 59. Lead wires 46 and 47 of ultrasonic transceivers 40 are connected to circuit board 62 by soldering or the like. Further, board case 63 represented by a broken line is placed so as to cover circuit board 62.

Then, the ultrasonic signal from upstream ultrasonic transceiver 40 on the upstream side is reflected, on a rout represented by arrow P1, by inner wall 51a of the opposing flow path, then passes through a route represented by arrow P2, and is received by ultrasonic transceiver 40 on the downstream side.

With the above configuration, ultrasonic flow meter 60 of the present exemplary embodiment can obtain the flow rate by the above-described Equation (1), as described with reference to FIG. 9.

As described above, an ultrasonic transceiver in a first disclosure includes: a piezoelectric element; and a plurality of acoustic matching layers stacked on and joined to the piezoelectric element directly or via another layer, wherein at least a part of a joining part between the acoustic matching layers is disposed inside an outer periphery of a joining surface of the acoustic matching layer disposed on a side of the piezoelectric element.

With this configuration, it is possible to suppress the propagation of the indirect wave from the acoustic matching layer on the piezoelectric element side to the next acoustic matching layer.

In an ultrasonic transceiver in a second disclosure may be configured, in the first disclosure, as follows. The plurality of acoustic matching layers includes: a first acoustic matching layer joined to the piezoelectric element directly or via another layer; and a second acoustic matching layer stacked on and joined to the first acoustic matching layer, wherein the first acoustic matching layer has a disk shape, the second acoustic matching layer has a rectangular shape, and a short side of a joining surface via which the second acoustic matching layer and the first acoustic matching layer are joined together is shorter than a diameter of the first acoustic matching layer.

An ultrasonic transceiver in a third disclosure may be configured, in the second disclosure, as follows. The piezoelectric element has a joining surface having a rectangular shape, and a direction of a long side of the piezoelectric element coincides with a long-side direction of the second acoustic matching layer.

An ultrasonic transceiver in a fourth disclosure may be configured, in the first disclosure, as follows. A thickness of each of the acoustic matching layers is about ¼ of a wavelength of an ultrasonic wave propagating through the each of the acoustic matching layers.

An ultrasonic transceiver in a fifth disclosure may be configured, in the second disclosure, as follows. A thickness of each of the acoustic matching layers is about ¼ of a wavelength of an ultrasonic wave propagating through the each of the acoustic matching layers.

An ultrasonic transceiver in a sixth disclosure may be configured, in the third disclosure, as follows. A thickness of each of the acoustic matching layers is about ¼ of a wavelength of an ultrasonic wave propagating through the each of the acoustic matching layers.

An ultrasonic transceiver in a seventh disclosure may be configured, in the first disclosure, as follows. An acoustic impedance of each of the acoustic matching layers is larger toward the piezoelectric element.

An ultrasonic transceiver in an eighth disclosure may be configured, in the second disclosure, as follows. An acoustic impedance of each of the acoustic matching layers is larger toward the piezoelectric element.

An ultrasonic transceiver in a ninth disclosure may be configured, in the third disclosure, as follows. An acoustic impedance of each of the acoustic matching layers is larger toward the piezoelectric element.

An ultrasonic flow meter in a tenth disclosure includes: a measurement flow path that has a rectangular cross-section and that a fluid to be measured flows through; a plurality of partition plates that are inserted in parallel between two opposing surfaces of the measurement flow path and divide the measurement flow path into multiple layers; a pair of ultrasonic transceivers disposed upstream and downstream of a surface, of the measurement flow path, different from the two opposing surfaces, and each of the pair of ultrasonic transceivers is the ultrasonic transceiver disclosed in any one of the second to ninth disclosures.

An ultrasonic flow meter in an eleventh disclosure may be configured, in the tenth disclosure, as follows. Each of the ultrasonic transceivers is disposed in the measurement flow path with a long-side direction of the second acoustic matching layer parallel to the partition plates.

An ultrasonic flow meter in a twelfth disclosure may be configured, in the eleventh disclosure, as follows. A length of the second acoustic matching layer in a short-side direction is equal to or larger than a distance between the partition plates.

INDUSTRIAL APPLICABILITY

As described above, with the ultrasonic transceiver according to the present disclosure, it is possible to reduce reverberation of an ultrasonic wave and to limit an ultrasonic propagation path, and the ultrasonic transceiver can also be applied to applications such as in-vehicle sensing devices and the like.

REFERENCE MARKS IN THE DRAWINGS 10, 20, 30, 40, 70, 80: ultrasonic transceiver
11, 41: case
12, 42: piezoelectric element
13, 23, 43: first acoustic matching layer (acoustic matching layer)
14, 24, 34, 44, 74: second acoustic matching layer (acoustic matching layer)
25: third acoustic matching layer (acoustic matching layer)
51: measurement flow path
52: partition plate
60: ultrasonic flow meter

The invention claimed is:

1. An ultrasonic transceiver comprising:
a piezoelectric element; and
a plurality of acoustic matching layers stacked on and joined to the piezoelectric element directly or via another layer,
wherein at least a part of a joining part between the plurality of acoustic matching layers is disposed inside an outer periphery of a joining surface of the acoustic matching layer disposed on a side of the piezoelectric element,
the plurality of acoustic matching layers includes:
a first acoustic matching layer joined to the piezoelectric element directly or via another layer; and
a second acoustic matching layer stacked on and joined to the first acoustic matching layer,
the first acoustic matching layer has a disk shape,
the second acoustic matching layer has a rectangular shape, and
a length of the second acoustic matching layer in a short-side direction is shorter than a diameter of the first acoustic matching layer, and
a length of the second acoustic matching layer in a long-side direction is longer than the diameter of the first acoustic matching layer.

2. The ultrasonic transceiver according to claim 1, wherein
the piezoelectric element has a joining surface having a rectangular shape, and
a direction of a long side of the piezoelectric element coincides with the long-side direction of the second acoustic matching layer.

3. The ultrasonic transceiver according to claim 2, wherein a thickness of each of the plurality of acoustic matching layers is about 1/4 of a wavelength of an ultrasonic wave propagating through the each of the plurality of acoustic matching layers.

4. The ultrasonic transceiver according to claim 2, wherein an acoustic impedance of each of the plurality of acoustic matching layers is larger toward the piezoelectric element.

5. The ultrasonic transceiver according to claim 1, wherein a thickness of each of the plurality of acoustic matching layers is about 1/4 of a wavelength of an ultrasonic wave propagating through the each of the plurality of acoustic matching layers.

6. The ultrasonic transceiver according to claim 1, wherein an acoustic impedance of each of the plurality of acoustic matching layers is larger toward the piezoelectric element.

7. An ultrasonic flow meter comprising:
a measurement flow path that has a rectangular cross-section and that a fluid to be measured flows through;

a plurality of partition plates that are inserted in parallel between two opposing surfaces of the measurement flow path and divide the measurement flow path into multiple layers;

a pair of ultrasonic transceivers disposed upstream and downstream of a surface, of the measurement flow path, different from the two opposing surfaces, and each of the pair of ultrasonic transceivers is the ultrasonic transceiver according to claim 1.

8. The ultrasonic flow meter according to claim 7, wherein each of the ultrasonic transceivers is disposed in the measurement flow path with the long-side direction of the second acoustic matching layer parallel to the plurality of partition plates.

9. The ultrasonic flow meter according to claim 8, wherein the length of the second acoustic matching layer in the short-side direction is equal to or larger than a distance between the plurality of partition plates.

* * * * *